ated Dec. 20, 1960

2,965,590

LATEX PAINT WITH AN ESTERIFIED POLYETHER MODIFIER

Edwin F. Schumacher and Leslie B. Stokes, Louisville, Ky., assignors to Devoe & Raynolds Company, Inc., a corporation of New York No Drawing. Filed Feb. 27, 1957, Ser. No. 642,678

4 Claims. (Cl. 260—23)

This invention relates to the preparation of films from polymer dispersions, and more specifically to pigmented or unpigmented coating compositions, the vehicle of which is an emulsion of the binder in water. Because of the popularity of latex paints, developments in polymer emulsions which include both homopolymer or copolymer emulsions in which the water is the continuous phase, have been rapid over the last few years and many changes such as internal plasticization, post plasticization, and alkyd modification have been introduced. Two of the principal advantages of modern latex coating compositions are their ease of application and their good film properties. The good film properties are due to the fact that the binder includes a long chained high molecular weight polymer such as polyvinyl acetate, butadiene-styrene, polystyrene, and the like.

While latex coating compositions have enjoyed wide spread use and acceptance they are nevertheless subject to several disadvantages. Accordingly, despite rapid developments in latex or oil-in-water emulsion coating compositions since they first appeared, there is need for further improvement. The strong cohesive property of high polymers imparts great strength to their films. However, because of the high molecular weights of the polymers they do not penetrate into porous surfaces. This is a disadvantage when latex coatings are applied to porous substrates which are subject to weathering. Such films tend to blister and are therefore not permanent. In addition, when latex coating compositions are applied to chalky surfaces, such as are formed on weathered oil paints resulting from destruction of the binder, or from particle accumulation from natural causes, adhesion is not completely satisfactory. Improved adhesion is obtained from the addition of alkyd resins but such addition detracts from maximum alkali resistance and sealing properties. Another disadvantage of latex coating compositions has been their inherent thermoplasticity, as well as low scuff resistance.

According to the practice of this invention, all of these disadvantages are overcome. In one of its important aspects, this invention relates to the tendency of synthetic resin latices to discolor when applied to masonry. A particularly perplexing problem has been that of painting new or unweathered exterior masonry surfaces with latex paints. When latex paints are applied to such unweathered exterior masonry surfaces or on interior masonry surfaces which may be exposed to water, discoloration and film whitening of colored latex paints occur, so that white streaked surfaces result apparently due to leachable salts in the cement.

In accordance with this invention latex paints are provided which when applied to unweathered masonry surfaces have little tendency to whiten during weathering. Further, films are formed which on weathering do not blister or peel when applied to porous and chalky substrates; and in addition the films are highly resistant to alkalies. Moreover, because of their inherent thermoplasticity latex compositions have been impractical for use on floors. They tend to soften and tackify in hot weather and collect dust or dirt. This invention provides a latex film which is not thus affected by hot weather. In the practice of this invention a composition of matter is provided which is adapted for dispersion in a pigmented or unpigmented coating composition, the vehicle of said coating composition being an emulsion of the binder in water. It is understood, however, that the composition of the invention can also be dispersed in the coating composition when the coating is being made. Accordingly, in one of its aspects this invention pertains to modifying compositions for addition to latex coating compositions, which modifying compositions comprise a liquid mixture of a surface active agent and an unsaturated higher fatty acid ester, including the partial ester, of an epoxy alkyl or hydroxy alkyl phenyl polyether. In other words, the invention contemplates either a solution or an emulsion of a surface active agent and an ester of a glycidyl polyether or the corresponding polyether containing terminal hydroxyl groups instead of epoxide groups.

The polyethers contemplated therefore include epoxy or hydroxy terminated polymeric polyether derivatives of polyhydric phenols, which polyhydric phenols are free from functional groups other than phenolic hydroxyl groups, having a plurality of alternating aromatic nuclei and of aliphatic chains united through ether oxygen, the aromatic nuclei being the hydrocarbon nucleus of the polyhydric phenol and being free from functional groups other than phenolic hydroxyl groups.

Esters, including partial esters, of both epoxy and hydroxy terminated polymeric polyether derivatives of polyhydric phenols are known. U.S. Patents 2,456,408 and 2,653,141, among other things, disclose esters of hydroxyl terminated alkyl phenyl polyethers. Included are both complete and partial esters of polymeric polyhydric alcohols which are polyether derivatives of polyhydric phenols having hydroxyl containing aliphatic radicals united to phenolic residues through ether linkages. These polymeric polyhydric alcohols are generally prepared by the reaction of polyhydric phenols with polyhaloalcohols, epihalohydrins or polyepoxy compounds used as polyfunctional compounds (functional in this case referring to reactivity with a phenol group or its salt). The degree of polymerization will depend upon the amount of polyfunctional compound used. The number of hydroxyl groups in the ester will vary with the nature and amount of unsaturated acids used in esterification. The number of hydroxyl groups in the polymeric hydroxy alkyl phenyl ether thus will vary from three to twenty depending upon the degree of polymerization. When these polymeric polyhydric alcohols are subjected to limited esterification with higher unsaturated fatty acids they give products which are still semisolid or solid and which are soluble in volatile solvents. By higher fatty acid is meant a monobasic aliphatic carboxylic acid of more than ten carbon atoms. Included are undecylenic acid, oleic acid, erucic acid, linoleic acid, linolenic acid and the like. Particularly desirable are drying oil acids such as those derived from soyabean oil, oils from the seeds of sunflower, safflower, as well as poppy and hemp seed. Fatty acids derived from linseed oil, dehydrated castor oil, sardine oil and tall oil acids are also suitable.

Esters and partial esters of epoxy terminated alkyl phenyl polyethers are disclosed in U.S. Patent 2,759,901 and reissue patent Re. 24,047. Both epoxy and hydroxy terminated alkyl phenyl polyethers are produced from various dihydric phenols such as resorcinol, catechol, phloroglucinol, etc. or polynuclear polyhydric phenols such as bisphenol, p,p'-dihydroxy benzophenone, p,p'-dihydroxy diphenyl sulfone, tetrahydroxy diphenyl dimethyl methane, polyhydric anthracenes and polyhydric naphthalenes, etc. The invention thus contemplates esters, including partial esters, of polymeric epoxide resins resulting from the reaction of a polyhydric phenol with an epihalohydrin or glyceryl dichlorhydrin in the presence of an alkali.

In the preparation of the esters, it is desired that at least about five percent and advantageously more than twenty-five percent of the hydroxyl, or hydroxyl and epoxy, groups present in the hydroxy or epoxy alkyl phenyl polyether be esterified to form the final composition. Valuable drying esters can be made from semi-drying oil acids, and from even the so-called non-drying oil acids containing oleic and other unsaturated acids, by esterification of hydroxyl alkyl phenyl polyethers when the polyethers contain a sufficient number of hydroxyl groups per molecule.

In dispersing the epoxy or hydroxy alkyl phenyl polyether esters according to the invention in the latex a surface active agent is used to confer stability upon the resulting system. But it will be understood that it is impossible to predict which surface active agents are best suited for the most stable dispersions and also for the best film properties in the resulting coatings. Knowledge of surface active agents is not sufficiently developed to enable one to predict which surface active agents can best be used. In addition, coating compositions made without selectively choosing the surface active agent may be substandard in one or more of their desirable characteristics such as clarity of resulting film, leveling, brushability, flow and the like. For this reason it is ordinarily necessary to try each surface active agent in the system before one can safely say that it will function properly. This, however, presents no great problem because it is merely a question of routine testing. A few generalities can be drawn. For instance, cationic surface active agents are not suitable. There are also certain considerations which are of great value in the selection of desirable surface active agents, particularly since there are so many commercial surface active agents. A surface active agent in addition to lowering the interfacial tension so that the dispersion is obtained must protect the resulting particles against coalescence or agglomeration prior to application to the surface to be coated. The surface active agent must therefore concentrate at the interface. This will occur if the hydrophilic portion of the surface active agent is sufficiently attracted by the water phase or repulsed by the oil phase, or if the hydrophobic portion is sufficiently attracted by the oil phase or repulsed by the water phase. In other words, there must be a balance between the hydrophilic and the lipophilic portions of the molecule. However, in this form the relationship is not particularly useful. Recently, however, numerical values have been assigned to surface active agents, thereby providing a system of classification that is related to their behavior and to their solubility in water. This system is called the hydrophile, lipophile balance method, the HLB method, and has been described in several publications. See "Calculation of HLB Values of Non-ionic Surfactants," by William C. Griffin, Journal of the Society of Cosmetic Chemists, vol. V, No. 4, December, 1954. Mr. Griffin points out that, "The HLB value is useful because it allows a prediction of the action that may be expected from a surfactant; for example, a low value, about 4, will be a water-in-oil emulsifier; a high value, about 16, will be a solubilizer." Most surface active agents suitable for use herein have an HLB value in the range of 8 to 20.

In addition to the HLB value a surface active agent must have some affinity for the oil or dispersed phase. It is generally believed that the oil and the lipophile portion of the surfactant should have similar solubility characteristics. Desirable surface active agents are miscible with the ester solution to the extent of at least 0.5 percent. Among the various surface active agents meeting these tests are such commercial surface active agents as Atlas G-3300—aryl alkyl sulfonate; Emulphor ON-870—polyoxyethylene fatty alcohol; Atlas G-3910—polyoxyethylene allyl alcohol; Tween 20—polyoxyethylene sorbitan monolaurate; Atlas G-1086—polyoxyethylene sorbitol hexaoleate; Igepal CA-630—polyoxyethylene alkyl phenol; Atlas G-3930—polyoxyethylene oleyl ether; Emulphor EL-719—polyoxyethylene vegetable oil; Atlas G-1096—polyoxyethylene sorbitol heptooleate; Renex 20—polyoxyethylene esters of mixed fatty and resin acids; Atlas G-1679—polyoxyethylene alkyl phenol condensate; Tween 60—polyoxyethylene sorbitan monostearate; Atlas G-3920—polyoxyethylene oleyl alcohol; etc. In addition, mixtures of surface active agents can be used, a particularly suitable mixture being a mixture of Span 80—sorbitan monooleate, and Tween 80—polyoxyethylene sorbitan monooleate. A very suitable surface active agent is Triton X-100 (Antarox A-400)—

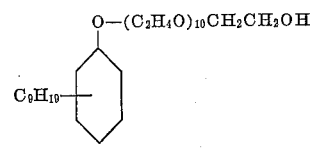

Others are Tween 85—polyoxyethylene sorbitan trioleate, and Antara 244—one-third methyl alcohol and two-thirds of the condensation product of nonyl phenol with ten mols of ethylene oxide. Summarizing, some anionic surface active agents and many non-ionic surface active agents can be used. Particularly desirable surface active agents are esters, ethers, amines and amides of a monomeric organic compound containing a hydrophobic group of at least eight carbon atoms (and preferably larger, e.g., twelve to twenty carbon atoms) and also having a sufficient number of oxyalkylene groups to form a hydrophilic polyether portion of the molecule, the resultant water soluble non-ionic agent having a molecular weight of not less than 550. A preferred alkylene oxide for making these oxyalkylene products is ethylene oxide, but propylene oxide is equally suitable.

The invention thus contemplates a modifying composition in liquid phase containing an unsaturated higher monobasic acid ester of an epoxy alkyl or hydroxy alkyl phenyl polyether and from 0.5 to 8 weight percent surface active agent based on the ester, the modifying composition being adapted for addition to latex coatings in quantities sufficient to improve adhesion of films to porous and chalky surfaces subject to weathering generally such that from 2 to 40 weight percent ester in the modifier is used based on the total paint weight. Since the modifier is a liquid the modifying composition includes not only the surface active agent but a solvent for the ester of the hydroxy or epoxy alkyl phenyl polyether when the ester is not a liquid, the ester when in solution generally being employed as a 30 to 85 percent solids solution. In addition to solvents water can also be added, thereby providing an emulsion rather than a solution, sufficient water being used so that water is the continuous phase. The particular solvent, if used, and whether it is aromatic or paraffinic in nature, depends on the nature of the ester.

While any of the known strong solvents such as xylene, methyl ethyl ketone, benzene, and the like can be used, preferred solvents are those solvents normally employed as thinners in oleoresinous paints, for example, mineral spirits, toluene, hi-flash naphtha, VMP naphtha, etc., solvents like mineral spirits being used when the polyether is highly esterified, aromatics being used when it is not. Also, while their use is not essential driers desirably can be included in the modifying composition so that unusually long drying times are not encountered. Any of the conventional paint driers can be used in amounts from 0.02 to 1 percent depending on the choice of drier and the nature of the modifier, these amounts being based on the nonvolatile of the modifier. Conventional paint driers are heavy metal soaps, for example, aliphatic and naphthenic acid salts of manganese, cobalt, calcium, zinc, lead, etc.

Another unessential but desirable component of the modifying composition is an oleoresinous varnish, that is, a drying oil, a drying oil containing a natural or synthetic resin, or an oil modified glyceryl phthalate. The proportions of resin to oil are limited by viscosity considerations, the shorter the oil length, in gallons of oil per one hundred pounds of resin, the greater the viscosity. An oil length of at least about twenty is preferred with such resins as phenolics, ester gum, polyesters, etc. The oleoresinous varnish is employed in an amount of 0.5 to 3 parts per part of ester by weight, optimum properties resulting from the use of one part oleoresinous varnish per part of ester.

While the modifying composition has been described in some detail, it is noted that the invention is not limited thereto but includes latex coating compositions containing from 2 to 40 weight percent of the modifying ester based on the total paint weight and a surface active agent, in an amount of 0.5 to 8 weight percent on the ester, the ester or a solution of the ester having been dispersed in the latex.

The coatings in which the modifying compositions of this invention are incorporated are latex coating compositions, latices being dispersions in water systems of polymers capable on drying or evaporation of forming continuous films. The latices employed in the preparation of coating compositions, the vehicles of which are emulsions of the binder in water, are well known, for example, latices formed by the vinyl-type or olefinic emulsion polymerization.

The binder in latex coating compositions is a polymeric material and both homopolymers and copolymers are included. Polymers range from hard materials such as polystyrene to materials having good flexibility depending upon the composition of the polymers. The homopolymers may be considered to be substituted polyethylenes since they are based on modifications of the ethylenic group $>CH_2=CH_2<$. The polymeric chains are bound together by secondary valence forces of the monomers, examples of which are butadiene, vinylchloride, vinylacetate, acrylonitrile, ethylene, styrene, vinylidine chloride, the acrylates, the methacrylates which form such polymers as polybutadiene, polyvinylchloride, polyvinylacetate, polyacrylonitrile, polyethylene, polystyrene, polymethylacrylate, polyvinylchloride, butadiene-styrene, vinylidine-chloride-vinylchloride and polymethyl methacrylate. Typical examples of the latices are butadiene-styrene copolymer latex, plasticized polystyrene latex, polyvinyl acetate latex, polyacrylic type latex, and vinylidinechloride-vinylchloride latex. Depending upon the nature of the latex used it may be necessary to incorporate a plasticizer to aid in film formation. Such latices are commercially available in such forms as Koppers Polystyrene Emulsion P, Dow Latex 580, Dow Latex 762 W, Hycar Latices, Saran Latex F 122, Jones-Dabney Polytex 600, and Rhoplex AC-33.

This invention contemplates the use of epoxy or hydroxy ester modifying composition in both pigmented or unpigmented latex finishes. The pigmentation of latex finishes is generally known, the main problem being that of obtaining satisfactory pigment dispersion. Generally, pigments applicable to the formulation of water dispersed paints are obtained either as water pulps from the pigment manufacturer in either flocculated or deflocculated states; or pigment suspensions are prepared using pigments with agents dissolved to produce dispersion in water. The production of a stable paint is then dependent upon the uniform compatibility of the pigment suspension and the binder suspension. With these considerations pigments normally employed in all latex paints have a high specific conductance, that is, a low percentage of water soluble salts can be used, for example, titanium dioxide, iron oxide, chromium oxide, aluminum silicate, magnesium silicate, calcium carbonate and silica. In addition, various organic pigments are known, such as toluidine red and phthalocyanine blue.

Latex coating formulations, of course, vary considerably depending upon the type of latex and whether or not pigments are used. A wide latitude of types and amounts of pigments is permissible. Formulations are available from both latex and pigment manufacturers. Latex paint formulas usually appear complex because various protective colloids, dispersing agents and other additives tend to complicate the formulation. Since it is customary to disperse pigments in a water phase and add the latex later, dispersing agents are necessary, and protective colloids are used to increase consistency and to improve stability.

It is believed that the invention can best be illustrated by reference to the following examples. The examples are intended to serve as illustrations only since modifications and variations will occur to those skilled in the art, having before them the teachings of the invention. Polyepoxides which are esterified as described in the examples are prepared in a manner described in U.S. Patents 2,467,171; 2,582,985; 2,538,072; 2,615,007; and 2,698,315 by the condensation of varying proportions of epichlorhydrin to bisphenol and subsequent dehydrohalogenation with sodium hydroxide. The table which follows indicates the ratio of epichlorhydrin to bisphenol used to prepare the polyepoxides and in the examples which follow the polyepoxides will be referred to by their epoxide designation, e.g., epoxide A.

| Epoxide | Ratio | | Epoxide equivalent |
|---|---|---|---|
| | Epichlorhydrin | Bisphenol | |
| A | 1.29 | 1 | 700 to 860. |
| B | 1.22 | 1 | 875 to 975. |
| C | 100 parts of Epoxide B plus 3.25 parts of Bisphenol. | | 1,000 to 1,300. |
| D | 100 parts of Epoxide B plus 5.0 parts of Bisphenol. | | 1,500 to 2,100. |

In the examples which follow the surface active agents are referred to by the trade-mark under which they are sold, for example, Triton X-100. All of the marks used in the examples are exemplified in the discussion of surface active agents supra.

*Example 1*

EXTERIOR MODIFIED LATEX PAINT

| Lbs. | Gallons | Material |
|---|---|---|
| 80.0 | 2.29 | rutile titanium dioxide. |
| 75.0 | 1.73 | chromium oxide. |
| 100.0 | 4.67 | aluminum silicate. |
| 4.0 | 0.44 | Triton X-100. |
| 250.0 | 29.94 | methyl cellulose (two percent aqueous solution). |
| 214.5 | 25.75 | water. |
| 300.0 | 32.43 | polyvinyl acetate emulsion (58.5 percent non volatile matter. |
| 24.0 | 2.75 | dibutyl phthalate. |
| 1,047.5 | 100.00 | |

Procedure: The pigments, water, and Triton X-100 in the above composition are ground in a pebble mill, high-speed stone mill or other suitable equipment. The resulting ground pigment paste is then blended with the latex and plasticizer mixture to prepare an unmodified latex paint.

A solution containing partially esterified mixed epoxy esters is prepared by heating 43.8 parts by weight of epoxide B with 19.2 parts by weight of rosin acids, 8.1 parts by weight of linseed fatty acids, and 32.5 parts by weight of soya fatty acids in the presence of mineral spirits to obtain a mixed 87 percent esterified epoxide as a forty percent solids solution.

A modified latex exterior paint is made by adding to the unmodified latex paint, with agitation, 17.5 percent of the forty percent solids epoxy ester solution (based on the total paint weight) and 0.4 percent of a surface active agent (Triton X-100) so that the epoxy ester solution is emulsified as it is added to the latex paint. A cement-asbestos panel coated with the unmodified latex paint, when subjected to a 325 hour accelerated weather test in an Atlas BWM-C Weatherometer, shows blistering and considerable discoloration by whitening. Another panel treated with the modified latex paint exhibits no blistering after 325 hours and only a very slight discoloration.

*Example 2*

With a slightly different modifier a modified exterior latex paint is prepared according to the procedure of Example 1, using also the unmodified latex paint composition of that example. To the unmodified latex paint is added, with agitation, 8.75 percent (based on the total paint weight) of the mixed epoxy ester solution of Example 1 (forty percent solids) together with 8.75 percent (based on the total paint weight) of a long oil oleoresinous varnish consisting of 15.95 parts by weight of ester gum, 14.4 parts by weight of linseed oil, 49.6 parts by weight of soya type fatty acid esters, 0.1 part by weight naphthenate driers (based on the metal) and twenty parts by weight of mineral spirits. In addition, 0.40 percent (based on the total paint weight) of a mixture of ninety percent of Tween 80 with ten percent of Span 80 is included in the modified latex paint composition.

After eight months outside Southern exposure in the Louisville, Kentucky area, coatings of unmodified latex paint applied over chalky surfaces blister badly and exhibit poor adhesion. Another area of the same chalky surface treated with the modified latex paint of this example shows no signs of blistering or loss of adhesion after eight months exposure.

After a six months outside Southern exposure in the Louisville, Kentucky area of new stucco blocks coated with the unmodified latex paint of Example 1, bad film discoloration due to whitening is evidenced. New stucco blocks treated with the modified latex paint of this example showed no whitening and a paint film in good condition after six months exposure.

Exposure of new asbestos shingles in Florida for a six months period shows that shingles treated with the modified latex paint of this example are greatly improved in blister and whitening resistance over shingles (asbestos) treated with the unmodified latex paint.

*Example 3*

A modified latex exterior paint is prepared as described in Example 1 using the unmodified latex paint composition of that example, to which is added, with agitation, 17.5 percent (based on the total paint weight) of the mixed epoxy ester solution of Example 1, 17.5 percent (based on the total paint weight) of the oleoresinous varnish of Example 2 and 0.8 percent (based on the total paint weight) of a surface active agent composed of a mixture of fifty percent Atlas G-3910 and fifty percent Atlas G-3920.

New asbestos shingles treated with the unmodified latex paint of Example 1, after six months exposure in the Louisville, Kentucky area, show discoloration due to whitening and some blistering. Shingles treated with the modified latex paint of this example show no blistering and a marked improvement in discoloration after six months exposure at the same location.

*Example 4*

An 87 percent esterified epoxy ester solution (forty percent solids) is prepared by heating 43.8 parts by weight of epoxide B with 56.2 parts by weight of soya fatty acids in the presence of mineral spirits.

According to the procedure of Example 1 and utilizing the unmodified latex paint composition of that example a modified latex exterior paint is prepared by adding to the unmodified latex paint with agitation 35 percent (based on the total paint weight) of the epoxy ester solution of this example and 0.8 percent (based on the total paint weight) of a surface active agent (Triton X-100).

Upon exposure to an accelerated weathering test in an Atlas BWM-C type Weatherometer, cement-asbestos panels treated with the unmodified latex paint of Example 1 show discoloration due to whitening after 70 hours exposure. Cement-asbestos panels treated with the modified latex paint of this example show only slight discoloration even after exposure for 170 hours.

*Example 5*

A 97.3 percent esterified mixed epoxy ester solution of 52 percent solids content is prepared by heating 27.3 parts by weight of epoxide C with 35.4 parts by weight of soya type fatty acids and 37.4 parts by weight of a mixture of penta ester gum and pentaerythritol in the presence of mineral spirits.

A modified latex exterior paint is made by adding, with agitation, to the unmodified latex paint of Example 1, 17.5 percent (based on the total paint weight) of the 52 percent solids epoxy ester solution of this example together with 0.4 percent (based on the total paint weight) of a surface active agent (Triton X-100).

Exposure of new asbestos shingles in Florida for a six months period shows that shingles treated with the modified latex paint of this example still have a coating of perfect uniformity with no discoloration. However, the shingles treated with the unmodified latex paint of Example 1 show considerable discoloration due to whitening and a definite lack of coating uniformity at the end of the same period.

*Example 6*

A partially esterified epoxy ester solution is prepared by heating 29.7 parts by weight of epoxide A and 12.7 parts by weight of epoxide D with 61.2 parts by weight of tall oil containing thirty percent rosin acid in sufficient xylol to obtain a 94.7 percent esterified epoxy ester solution of 85 percent solids content.

An emulsion containing the epoxy ester solution is made by adding, with agitation, to the epoxy ester solution, six percent of a surface active agent (Atlas G-3910) and sufficient water to produce an emulsion of 65 percent solids content.

A modified latex floor paint is prepared from the following composition.

COMPOSITION GRIND PORTION

| Lbs. | Gallons | Material |
|---|---|---|
| 85.0 | 10.22 | water. |
| 3.0 | 0.13 | Ben-A-Gel.[1] |
| 4.0 | 0.50 | water dispersible soya lecithin. |
| 3.0 | 0.40 | Nopco JMK-1.[2] |
| 3.0 | 0.33 | Triton X-100. |
| 75.0 | 2.11 | titanium dioxide. |
| 100.0 | 4.66 | aluminum silicate pigment. |
| 2.0 | 0.18 | potassium tripolyphosphate. |

COMPOSITION VEHICLE PORTION

| Lbs. | Gallons | Material |
|---|---|---|
| 467.0 | 51.7 | polyvinyl acetate copolymer emulsion (50 percent solids). |
| 76.0 | 9.05 | epoxy ester emulsion. |
| 1.0 | 0.10 | lead naphthenate (24 percent). |
| 0.4 | 0.05 | cobalt naphthenate (6 percent). |
| 1.0 | 0.13 | ASA.[3] |
| 32.4 | 3.50 | ethylene glycol. |
| 21.1 | 2.50 | carbitol acetate. |
| 120.0 | 14.44 | water. |
| 993.9 | 100.00 | |

[1] Ben-A-Gel, trademark of the National Lead Co. for a highly purified bentonite.
[2] Nopco JMK-1, trademark of Nopco Chemical Co., Inc. for a defoamer.
[3] ASA, trademark of Allied Chemical & Dye Corp. for an antiskinning agent.

*Procedure.*—The Ben-A-Gel is added to the water and is agitated thoroughly. The remainder of the materials in the grind portion are added stepwise in the order listed and are passed through a Morehouse grinder or other suitable equipment after which the polyvinyl acetate copolymer emulsion and the epoxy ester emulsion mixed with the driers are added slowly with good agitation. The carbitol acetate and ethylene glycol are mixed with the remaining water before addition.

A portion of this modified latex floor paint applied over a concrete floor surface provides a superior scuff resistant film. This modified latex paint exhibits marked improvement in the inherent tendency of latex paints to become tacky and soft at higher temperatures, since it dries in 24 hours to a more rigid film.

A film of this modified latex paint when applied over steel and baked for 30 minutes at 250° F. to 300° F. provides a hard, tough film suitable as a baked on primer.

The marked improvement in latex coatings resulting from modification according to this invention is very evident from the above examples. Films on porous and chalky surfaces do not have adhesive properties comparable to those resulting from the use of this invention. In addition, modification according to the invention gives much better sheen uniformity after exposure on new asbestos shingles such as those exposed for six months in Florida. Modification prevents selective reduction of sheen. Further addition of esters in accordance with the invention permits use of the latex coatings on floors and their application to floors at lower temperatures because of the change in thermoplasticity. Resulting floor paints have improved water resistance, sheen, scuff resistance, and flexibility.

It is understood that various additions and modifications can be made to latex coatings within the scope of this invention, particularly since both the latex coatings and the surface active agents to which the invention applies are well known. It will be appreciated also that latex coatings improved by the practice of this invention can be pigmented or unpigmented. Moreover, by modification of the pigmentation, gloss or semi-gloss paints can be made. Additionally, freeze-thaw resistance is improved by the addition of materials such as ethylene glycol to the water phase. Protective colloids, for example, cellulosic thickeners such as carboxy methylcellulose, and also casein, soya proteins and the like are added. Defoamers such as kerosene, pine oil, octyl alcohol and tributyl phosphate are also added from time to time. In other words, addition to pigments of extenders, water, emulsifiers, thickeners, preservatives and dispersants are generally known, and, in many instances, plasticizers, freeze-thaw agents, mildew inhibitors, defoamers and buffers are also used. Such modifications and variations in latex paints fall within the scope of this invention since the invention has applications to latex paints thus modified.

What is claimed is:

1. In the production of interior and exterior aqueous emulsion polymerized paints to form latex paints containing latices of the group consisting of polybutadiene, polyvinylchloride, polyvinylacetate, polyacrylonitrile, polyethylene, polystyrene, polymethylacrylate, polyvinylchloride, butadiene-styrene, vinylidinechloride-vinylchloride, polymethyl methacrylate and acrylate esters, the improvement in latex paints to be applied to surfaces of the type of porous substrates subject to weathering, chalky surfaces, and masonry surfaces which deteriorate latex paint due to leachable salts, which improvement comprises dispersing in said latex paint a modifier comprising a solution of a higher unsaturated monobasic acid ester of a polyether selected from the group consisting of epoxy alkyl and hydroxy alkyl phenyl polyethers having terminal substituents selected from the group consisting of hydroxyl and oxirane radicals and from 0.5 to 8 weight percent based on the ester of a surface active agent selected from the group of non-ionic and anionic surfactants having HLB values in the range of 8 to 20 and miscible with the ester solution to the extent of at least 0.5 percent, the amount of modifying composition being such that from 2 to 40 weight percent of the ester is present in the paint based on the total paint weight.

2. The process of claim 1 wherein the polyether is a glycidyl polyether of a dihydric phenol.

3. The process of claim 1 wherein the modifier includes from 0.5 to 3 parts of an oleoresinous varnish per part of ester.

4. The process of claim 1 wherein the modifier contains from 0.02 to 0.1 percent of a heavy metal soap drier based on the ester.

References Cited in the file of this patent

UNITED STATES PATENTS

| | | |
|---|---|---|
| 2,602,315 | Morrison et al. | June 24, 1952 |
| 2,602,785 | Wiles | July 8, 1952 |
| 2,637,621 | Auer | May 5, 1953 |
| 2,681,322 | Auer | June 15, 1954 |
| 2,761,870 | Payne | Sept. 4, 1956 |
| 2,778,740 | Armstrong | Jan. 22, 1957 |
| 2,784,128 | Schroeder | Mar. 5, 1957 |
| 2,872,428 | Schroeder | Feb. 3, 1959 |

OTHER REFERENCES

Paint Oil & Chem. Rov., (Epon Resins-New Film Formers), pages 15–18, 48–49, Nov. 9, 1950.

Payne (1): Latex Paints, Paint, Oil and Chem., Rev., pages 14, 16, 18, 20, 22, 42, 44–46, 48–49, Oct. 22, 1953.

Atlas Surface Active Agents, Booklet ATL CD-41 6 M 4-49, pages 13–22, Atlas Powder Co., Wilmington, Del. (1949).